United States Patent [19]
Futsuhara

[11] Patent Number: 6,002,249
[45] Date of Patent: Dec. 14, 1999

[54] ROTATION DETECTION SENSOR

[75] Inventor: Koichi Futsuhara, Urawa, Japan

[73] Assignee: The Nippon Signal Co., Ltd., Tokyo, Japan

[21] Appl. No.: 08/875,937

[22] PCT Filed: Nov. 29, 1996

[86] PCT No.: PCT/JP96/03511

§ 371 Date: Aug. 8, 1997

§ 102(e) Date: Aug. 8, 1997

[87] PCT Pub. No.: WO97/22008

PCT Pub. Date: Jun. 19, 1997

[30] Foreign Application Priority Data

Dec. 11, 1995 [JP] Japan ................................... 7-322060
Dec. 22, 1995 [JP] Japan ................................... 7-334510

[51] Int. Cl.⁶ ........................................................ G01P 3/42
[52] U.S. Cl. ........................................ 324/160; 250/231.14
[58] Field of Search .................................... 324/160, 161, 324/166, 537, 772; 340/648, 679; 318/439; 250/231.14

[56] References Cited

U.S. PATENT DOCUMENTS 5,345,138  9/1994  Mukaidono et al. .
5,568,131  10/1996 Sakai ........................................ 340/648
5,619,110  4/1997  Sugimoto ................................ 318/439

FOREIGN PATENT DOCUMENTS

| 0 509 828 | 10/1992 | European Pat. Off. . |
| 2-294960 | 12/1990 | Japan . |
| 2 092 755 | 8/1982 | United Kingdom . |
| WO 94/23303 | 10/1994 | WIPO . |

*Primary Examiner*—Christine K. Oda
*Attorney, Agent, or Firm*—Finnegan, Henderson, Farabow, Garrett & Dunner, L.L.P.

[57] ABSTRACT

A rotation stopped detection sensor detects a rotation stopped condition of a rotatable body using a plurality of optical sensors. The detection sensor also includes a rotation disk having optical guide portions for guiding light beams from light emitting devices to respective light receiving devices, and light shut off portions for shutting off the light beams to the respective light receiving devices. The optical guide portions and the light shut off portions are disposed alternately on an outer peripheral portion of the rotation disk. The plurality of optical sensors are disposed such that when the disk is stopped, one of the optical sensors is always at a position corresponding to an optical guide portion. As a result, when the disk is stopped, there is always one output from the optical sensors which is at a high level. Hence the stopping of the disk can be advised using a direct output from the optical sensor.

9 Claims, 7 Drawing Sheets

ROTATION DETECTION SENSOR

FIELD OF THE INVENTION

The present invention relates to a rotation detection sensor for detecting a rotation stopped condition of a rotatable body, and in particular to a sensor technology for detecting such a rotation stopped condition of a rotatable body using a light beam.

BACKGROUND OF THE INVENTION

A conventional rotation detection sensor for detecting a rotation stopped condition of a rotatable body using a light beam comprises a single optical sensor and a rotatable disk (referred to hereunder simply as a disk) with an outer peripheral portion thereof having approximately equal width transparent portions which pass a light beam and opaque portions which do not pass a light beam. The optical sensor has a light source which generates an AC light beam by means of an AC signal from a signal generator, and a light receiving element for receiving the light beam from the light source, positioned facing each other on opposite sides of the outer peripheral portion of the disk, and generates from an output circuit, an output signal corresponding to a light received output from the light receiving element.

With such a construction, when the disk is rotating, the transparent portions and the opaque portions alternately intersect the light beam. Since the widths of the transparent portions and the opaque portions are approximately the same, then the output from the light receiving element of the optical sensor has an output form with a high level condition and a low level condition appearing alternately at approximately even interval following to the passing of the transparent portions and the opaque portions with rotation of the disk. Since the light source is driven by an AC signal from the signal generator, then in the case where the signal frequency of the signal generator is substantially higher than the rotational speed of the disk, the output signal from the optical sensor in the high level interval where the light beam is received, becomes an AC signal which is switched at the signal frequency of the signal generator.

When the disk stops rotating, then either a transparent portion or an opaque portion is positioned in the optical path of the light beam. Consequently, the output condition of the optical sensor is fixed at either a high level condition or a low level condition.

In this arrangement, when the disk stops rotating, an indicator lamp is illuminated, for example, for advising personnel that the vicinity of the disk is "not dangerous". In order to illuminate the indicator lamp with an output signal from the optical sensor, when the disk has stopped, a light beam is passed so that the output signal from the optical sensor becomes a high level condition, the indicator lamp can be illuminated directly by the output energy from the optical sensor. However, the disk will not always stop at a position where the light beam is passed. In the case where the disk stops at a position where the light beam is shut off, then the indicator lamp cannot be illuminated directly by the output signal from the optical sensor.

Therefore, it has been proposed that a rotation detection sensor has two indicator lamps, one having the output signal from the optical sensor input directly thereto, and the other having the output signal from the optical sensor input via a NOT circuit thereto, so that when the disk stops, one or the other of the two indicator lamps is continuously illuminated. In this case, when the disk is rotating the two indicator lamps flash alternately.

It has also been proposed that a rotation detection sensor has a circuit configuration with a single indicator lamp, which is devised such that the indicator lamp is continuously illuminated when the disk stops.

More specifically, the circuit configuration is such that a light received output from an optical sensor is rectified by a rectifying circuit, and a rectified output therefrom is then input to an on-delay circuit via a NOT circuit. An indicator lamp is then illuminated by an output from the on-delay circuit. The rectifying circuit in this case is a device for rectifying the envelope of the AC output signal from the optical sensor which is based on the passing and shut off of the light beam due to rotation of the disk. It has no rectifying function with respect to the AC signal having the frequency of the signal generator. That is to say, the envelope of the AC output signal from the optical sensor due to the passing of the transparent and opaque portions of the rotatable disk is treated as the AC signal, and this AC signal is rectified by the rectifying circuit.

In this way, whether the disk stops in a condition such that the light beam is received by the light receiving element via a transparent portion, or stops in a condition where the light beam is shut off by an opaque portion, once stopped, the output condition from the optical sensor is fixed and hence does not become alternating. Consequently, since if the disk is stopped, the rectified output from the rectifying circuit is always at a zero level, and the output signal from the NOT circuit is thus always a high level, then the indicator lamp can be illuminated after a predetermined time lapse by the output from the on-delay circuit.

However, with either of the abovementioned circuit configurations, the function of the NOT operation carried out by the NOT circuit is indispensable for illumination of the indicator lamp when the disk is stopped. Therefore the following problems arise.

In the case where the transparent portions of the disk become soiled, there is the possibility that even when a transparent portion intersects the light beam, light is not received by the light receiving element. In this case, the light received output level of the optical sensor will remain at a low level condition even if the disk is rotating. The indicator lamp to which the signal is input via the NOT circuit will therefore be continuously illuminated, indicating that the disk is stopped (rotation stopped) even though the disk may still be rotating. This situation can arise not only in the abovementioned case where the transparent portions become soiled. For example, the same can also occur in the case where the light source malfunctions so that light is not produced, or the light receiving element malfunctions so that light cannot be converted to an electrical signal, or the light source or light receiving element attachment becomes disconnected (in the case where the light receiving element is provided independent of the output circuit).

The present invention takes into consideration the above situations with the object of providing a rotation detection sensor which can advise of a rotatable body stopped condition by for example illumination of an indicator lamp, without using a NOT circuit to carry out a NOT operation on the output signal from the optical sensor.

SUMMARY OF THE INVENTION

To attain the advantages and in accordance with the purpose of the invention, as embodied and broadly described herein, the invention comprises a rotation detection sensor having a plurality of optical sensors each incorporating a light emitting device and a light receiving device. The rotation detection sensor also has a rotatable body having an optical guide portion for guiding light from the light emitting devices to the light receiving devices, and a light shut off portion for shutting off light from the light emitting devices which is incident on the light receiving devices. The optical guide portion and the light shut off portion are disposed alternately on the rotatable body in a circumferential direction. The optical sensors are disposed such that when the rotatable body is in a stopped condition, at least one or more of the plurality of optical sensors is at a position where light is received via an optical guide portion of the rotatable body.

With such a construction, when the rotatable body is rotating, the outputs from the respective optical sensors become AC signals. However, when the rotatable body is stopped, there is an optical sensor where the output signal is always fixed at a high level condition. Therefore, when the rotatable body is stopped, a high level output can be produced. Hence, the stopped condition of the rotatable body can be advised using output energy from the optical sensor.

The arrangement may be such that the rotatable body comprises transparent portions and opaque portions disposed alternately in the circumferential direction. The plurality of optical sensors are constructed such that the light emitting device and the light receiving device are disposed on either side of the rotatable body and facing each other.

Alternatively, the arrangement may be such that the rotatable body is constructed with light reflecting portions and non reflecting portions disposed alternately in the circumferential direction. The plurality of optical sensors are constructed such that the light emitting device and the light receiving device are disposed on the same side with respect to the rotatable body.

The arrangement may be such that the respective optical sensors are constructed such that an AC light beam is produced from the light emitting device due to an AC signal from a signal generator, and this light beam is received by the light receiving device and an AC output signal is produced, and there are provided for each of the optical sensors, a rectifying circuit for rectifying the AC output signal from the optical sensor, and an on-delay circuit for generating a delay output signal after lapse of a predetermined time from input thereto of a rectified output signal from the rectifying circuit, and in addition there is provided a logical sum circuit for carrying out a logical sum operation on the delay outputs from the respective on-delay circuits, the construction being such that when an output from the logical sum circuit is a logic value 1, the rotatable body is in a stopped condition.

With such an arrangement, when the rotatable body is rotating, an AC signal with a pulse width corresponding to the rotational speed of the rotatable body is generated from the respective optical sensors. If the pulse width of this AC signal is shorter than the delay time of the on-delay circuit, then the output from the on-delay circuit becomes a low level advising that the rotatable body is rotating, while when this becomes longer than the delay time of the on-delay circuit, the output from the on-delay circuit becomes a high level advising that rotation has stopped. That is to say, the high level condition output indicating the stopped condition of the rotatable body, is produced only when the rotatable body is stopped and the output from the optical sensor is maintained at a high level for longer than a predetermined time. Furthermore, if a fault occurs for example in the optical sensor, the output becomes a low level and hence fail safe characteristics are improved.

When the construction of each of the respective optical sensors is such that a DC signal is applied to the light emitting device to produce a light beam, and this light beam is received by the light receiving device and a DC output signal is produced, then arrangement may be such that there is provided a checking signal generator for applying a checking signal to the light emitting device in order to intermittently stop the light beam emitting operation of the light emitting device, and a NOT circuit for carrying out a NOT operation on the checking signal from the checking signal generator, and in addition there is provided for each respective optical sensor, a first logical sum circuit into which is respectively input via an AC coupling device, an output signal from the optical sensor and an output signal from the NOT circuit, for carrying out a logical sum operation, and an on-delay circuit for generating a delay output signal after lapse of a predetermined time from input thereto of a logical output signal from the first logical sum circuit, and there is provided a second logical sum circuit for carrying out a logical sum operation on the delay outputs from the respective on-delay circuits, the construction being such that when an output from the second logical sum circuit is a logic value 1, the rotatable body is in a stopped condition.

If the construction is as above, then also when an optical sensor is driven using a DC signal, it is possible to have a low level output condition at the time of a fault. Hence the fail-safe characteristics can be ensured. Moreover, due to the checking signal from the checking signal generator, the construction has a checking function for checking the normalcy of the output conditions from the optical sensor.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

Reference will now be made in detail to the present preferred embodiments of the invention, an example of each embodiment is illustrated in the accompanying drawings. Wherever possible, the same reference numbers will be used throughout the drawings to refer to the same or like parts.

Figure 1:
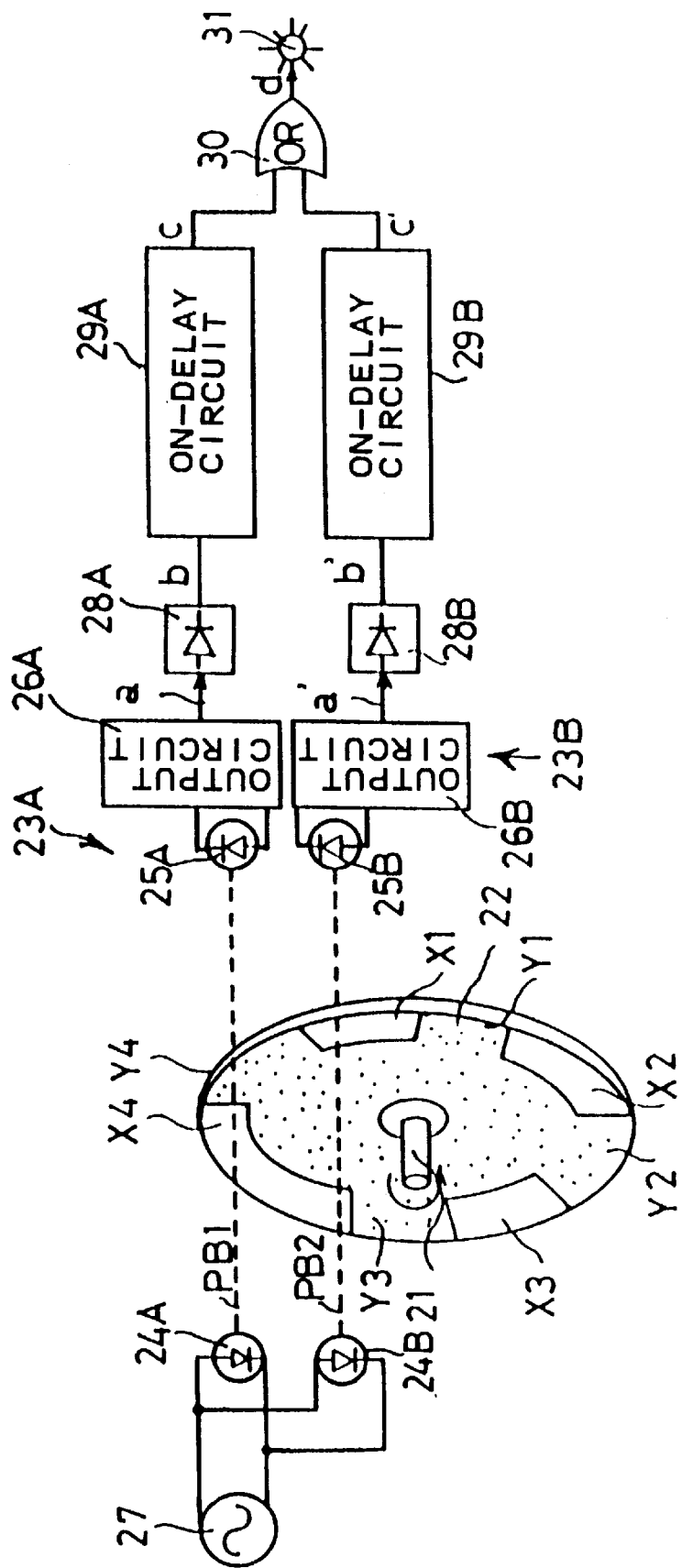
FIG. 1 is a circuit diagram illustrating a first embodiment of a rotation detection sensor according to the present invention.

FIG. 1 is a circuit diagram illustrating a first embodiment of a rotation detection sensor according to the present invention.

In FIG. 1, a rotatable disk 22 (referred to hereunder simply as a disk 22) serving as a rotatable body which is axially supported on a rotation shaft 21, is provided on an outer peripheral portion thereof with transparent portions $X_1$, $X_2$, $X_3$, $X_4$ serving as optical guide portions which pass light beams PB1, PB2, and opaque portions $Y_1$, $Y_2$, $Y_3$, $Y_4$ serving as light shut off portions which do not pass light, having approximately equal width around the circumferential direction.

Furthermore, with this embodiment, there is provided a plurality (in this case two) optical sensors 23A, 23B. The respective optical sensors 23A, 23B incorporate light sources 24A, 24B serving as respective light emitting devices, light receiving elements 25A, 25B serving as respective light receiving devices, and output circuits 26A, 26B respectively connected to the respective light receiving elements 25A, 25B. The respective light sources 24A, 24B are respectively connected to a signal generator 27 which generates an AC signal of frequency f1. The light sources 24A, 24B and the light receiving elements 25A, 25B are positioned facing each other on opposite sides of the disk 22, and when the disk 22 is stopped, one or other of the optical sensors 23A, 23B is opposite the location of one of the transparent portions $X_1$, $X_2$, $X_3$, $X_4$ of the disk 22.

Outputs a, a' from the output circuits 26A, 26B are rectified by respective rectifying circuits 28A, 28B. A rectified output b from the rectifying circuit 28A is input to an on-delay circuit 29A, while a rectified output b' from the rectifying circuit 28B is input to an on-delay circuit 29B. The rectifying circuits 28A, 28B have the function of rectifying the output signal of frequency f1 from the signal generator 27. Respective delay outputs c, c' from the on-delay circuits 29A, 29B are input to an OR circuit 30 serving as a logical sum circuit, and a logical output d from the OR circuit 30 is then used for controlling the illumination or extinguishing of an indicator lamp 31.

Figure 2:
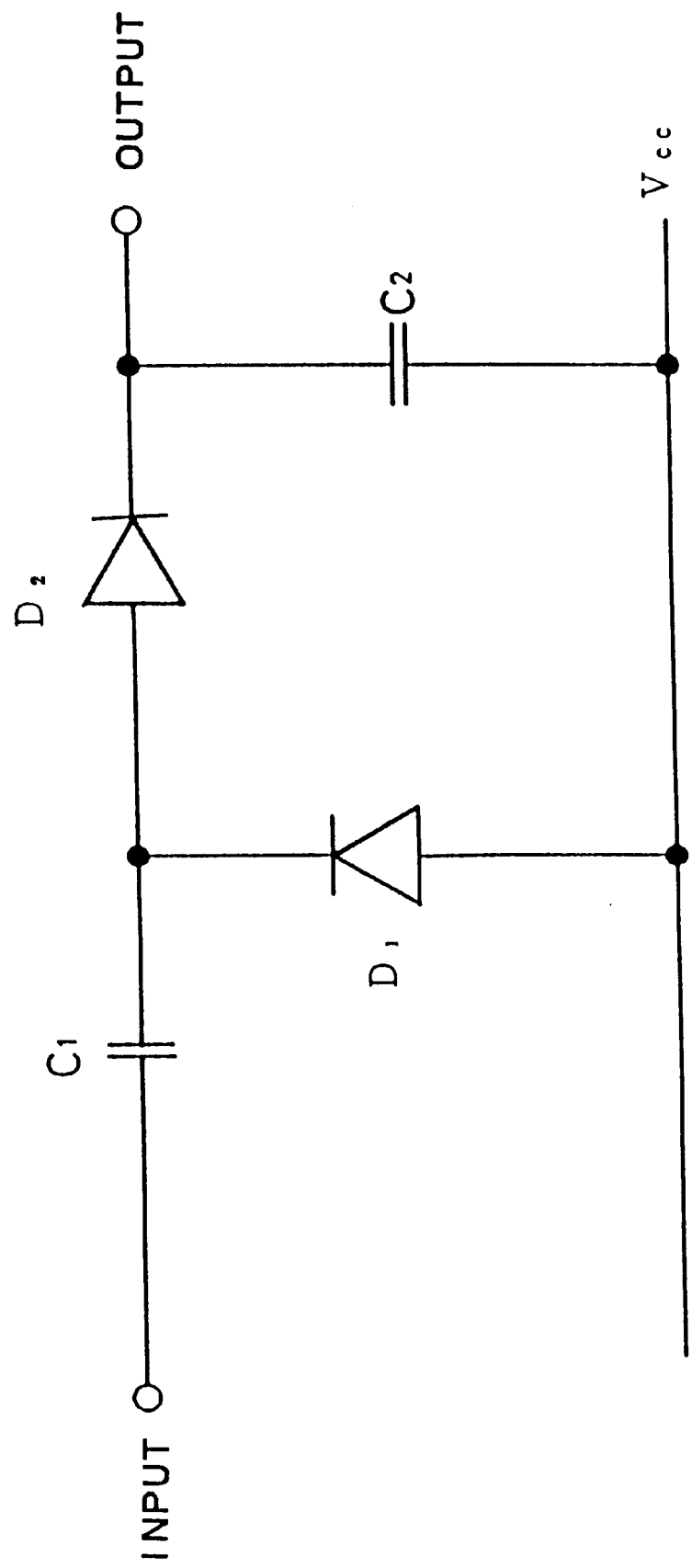
FIG. 2 is a circuit diagram of a rectifying circuit used in the first embodiment.

The rectifying circuits 28A, 28B are heretofore known voltage doubler rectifying circuits such as disclosed in U.S. Pat. No. 5,345,138. These voltage doubler rectifying circuits, as shown in FIG. 2, comprise two capacitors $C_1$, $C_2$ and two diodes $D_1$, $D_2$, configured such that an output signal is output clamped at a constant voltage Vcc.

Furthermore, the on-delay circuits 29A, 29B are heretofore known devices such as disclosed in WO94/23303, comprising a PUT oscillation circuit and a self hold circuit which uses a fail-safe window comparator/AND gate. These have a fail-safe construction in that only when an input signal equal to or greater than a predetermined level is applied, and the PUT oscillation circuit is operating normally producing an oscillating output, is a high level delay output generated, while at the time of a fault, an output is not produced.

Figure 3:
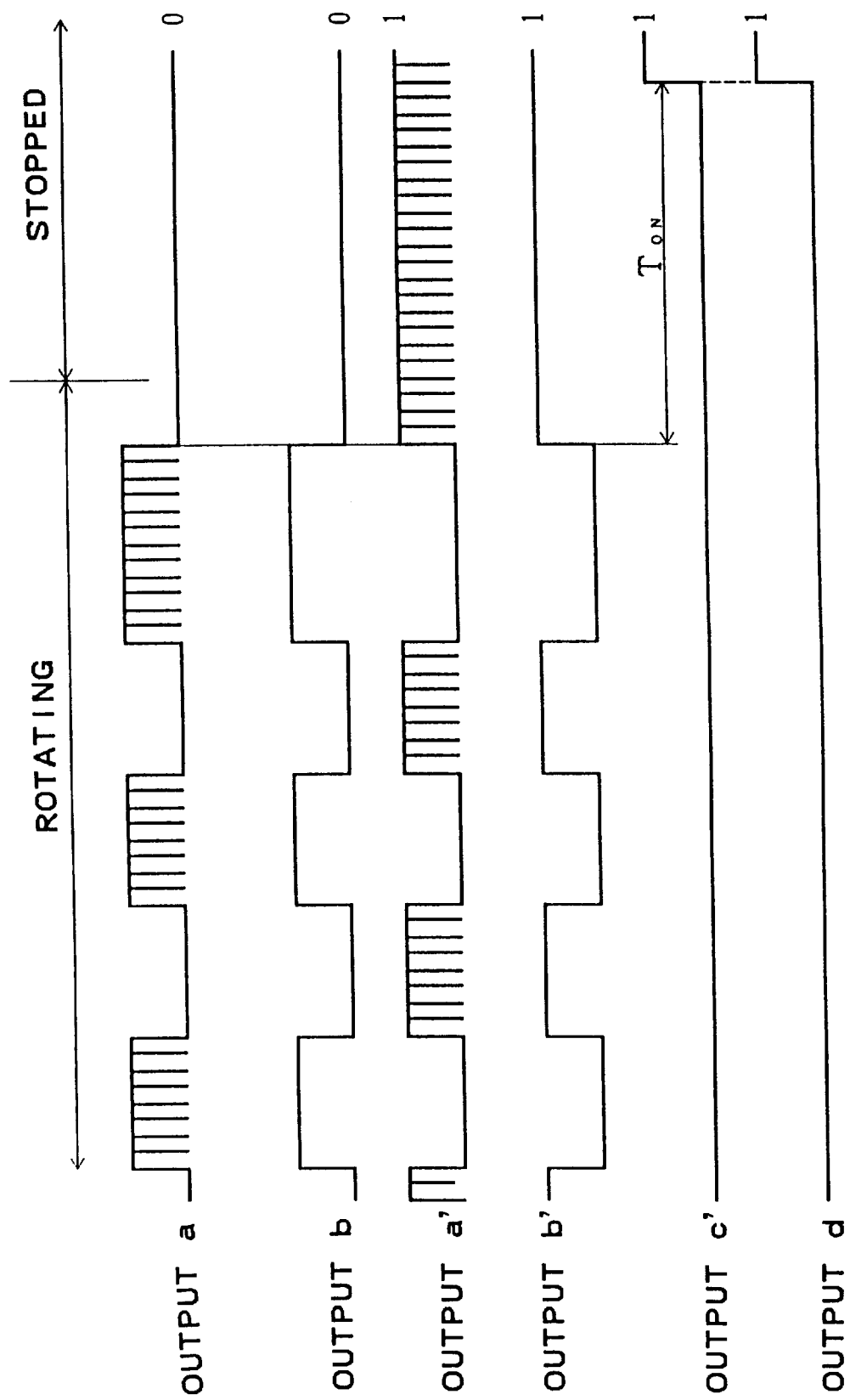
FIG. 3 is a time chart showing output conditions of respective portions of the circuit of FIG. 1.

Next is a description of the operation, with reference to the time chart of FIG. 3.

When the disk 22 is rotating, then the transparent portions $X_1$, $X_2$, $X_3$, $X_4$ of the disk 22 intersect one or other of the light beams PB1 and PB2 of the respective optical sensors 23A and 23B. Consequently, during rotation of the disk 22, the outputs a, a' of the output circuits 26A, 26B of the optical sensors 23A, 23B, as shown by the time chart of FIG. 3, switch alternately on and off (received/shut off). Furthermore, the respective outputs a, a' during the ON period in FIG. 3 become AC signals of frequency f1. The two rectifying circuits 28A, 28B respectively rectify the AC signals of frequency f1 which are produced alternately from the output circuits 26A, 26B based on the output frequency of the signal generator 27. Hence, envelope detection of an AC signal of frequency f1 is carried out by the rectifying circuits 28A, 28B. Rectified outputs b, b' with alternate high levels as shown in the time chart of FIG. 3 are thus generated alternately from the rectifying circuits 28A, 28B.

In the case where the disk 22 stops in the condition of FIG. 1 (that is, the light beam PB2 of the optical sensor 23B is passed by the transparent portion $X_1$), then the output b' on the rectifying circuit 28B side is maintained at a high level condition. The on-delay circuits 29A, 29B generate an output voltage signal when the output signals from the rectifying circuits 28A, 28B continue at a high level condition for longer than a predetermined time $T_{ON}$. Consequently, in this case at the point in time when the high level condition of the rectified output b' on the rectifying circuit 28B side, continues for the predetermined time $T_{ON}$, the output c' from the on-delay circuit 29B becomes a high level. As a result, the logical output d from the OR circuit 30 becomes a logic value 1 (high level) and the indicator lamp 31 comes on advising that the disk 22 has stopped.

With this embodiment, when the rotatable disk 22 is stopped, then one of the optical sensors 23A, 23B is at a position corresponding to a transparent portion $X_1$, $X_2$, $X_3$ or $X_4$ of the disk 22, so that the output c or c' from one of the on-delay circuits 29A or 29B becomes a high level condition. Consequently, the indicator lamp 31 always comes on irrespective of the position where the disk 22 stops, and hence the stopping of the disk 22 (corresponding to a safe condition) can be advised.

In this way, with the present embodiment, the stopping of the disk 22 can be advised by illumination of the indicator lamp 31, without including a NOT circuit (without carrying out a NOT operation).

If both of the light sources 24A, 24B have a fault so that the light beams PB1, PB2 are not produced, or if both of the light receiving elements 25A, 25B have a disconnection fault, then the outputs a, a' from the output circuits 26A, 26B both become a low level and hence the indicator lamp 31 does not come on.

Furthermore, if the light receiving elements 25A, 25B have a short circuit fault, then the outputs from the output circuits 26A, 26B do not change, remaining at a constant value. Therefore outputs from the rectifying circuits 28A, 28B are not produced (outputs b, b' are a low level) and hence the indicator lamp 31 does not come on. Moreover, since the rectifying circuits 28A, 28B and the on-delay circuits 29A, 29B have a fail safe construction such that an output is not produced at the time of a fault, then also if a fault occurs in these circuits, the indicator lamp 31 will not come on.

Consequently, the rotation detection sensor of this embodiment has a fail safe construction in that at the time of a sensor fault, the indicator lamp 31 will not come on.

Another situation considered is when the disk 22 is stopped, and there is a failure for example of a light source in the sensor which is at a position corresponding to an opaque portion $Y_1$, $Y_2$, $Y_3$ or $Y_4$ of the disk 22. This situation where the light source fails so that light is not produced, cannot be ascertained from the output side until the disk rotates to where the light beam should be received (this is then discovered from the fact that an output is not produced in the on-delay circuit). However, even if this situation arises, if the side which receives the other light beam is operating normally, then when the disk 22 rotates, the indicator lamp will go off (indicating danger). That is to say, the rotation detection sensor of this embodiment is configured as a dual system which uses only one indicator lamp (i.e. the indicator lamp on the side including the NOT operation of the conventional circuit which is not used).

With the abovementioned first embodiment, the construction is such that an AC signal is applied to the light sources 24A, 24B to give illumination, however a DC signal may instead be used. In this case, the rectifying circuits 28A, 28B can be omitted. However, if a DC signal is used, then if a short circuit fault occurs for example in the light receiving elements 25A, 25B, there is the possibility of a high level output being generated from the on-delay circuits 29A, 29B.

Figure 4:
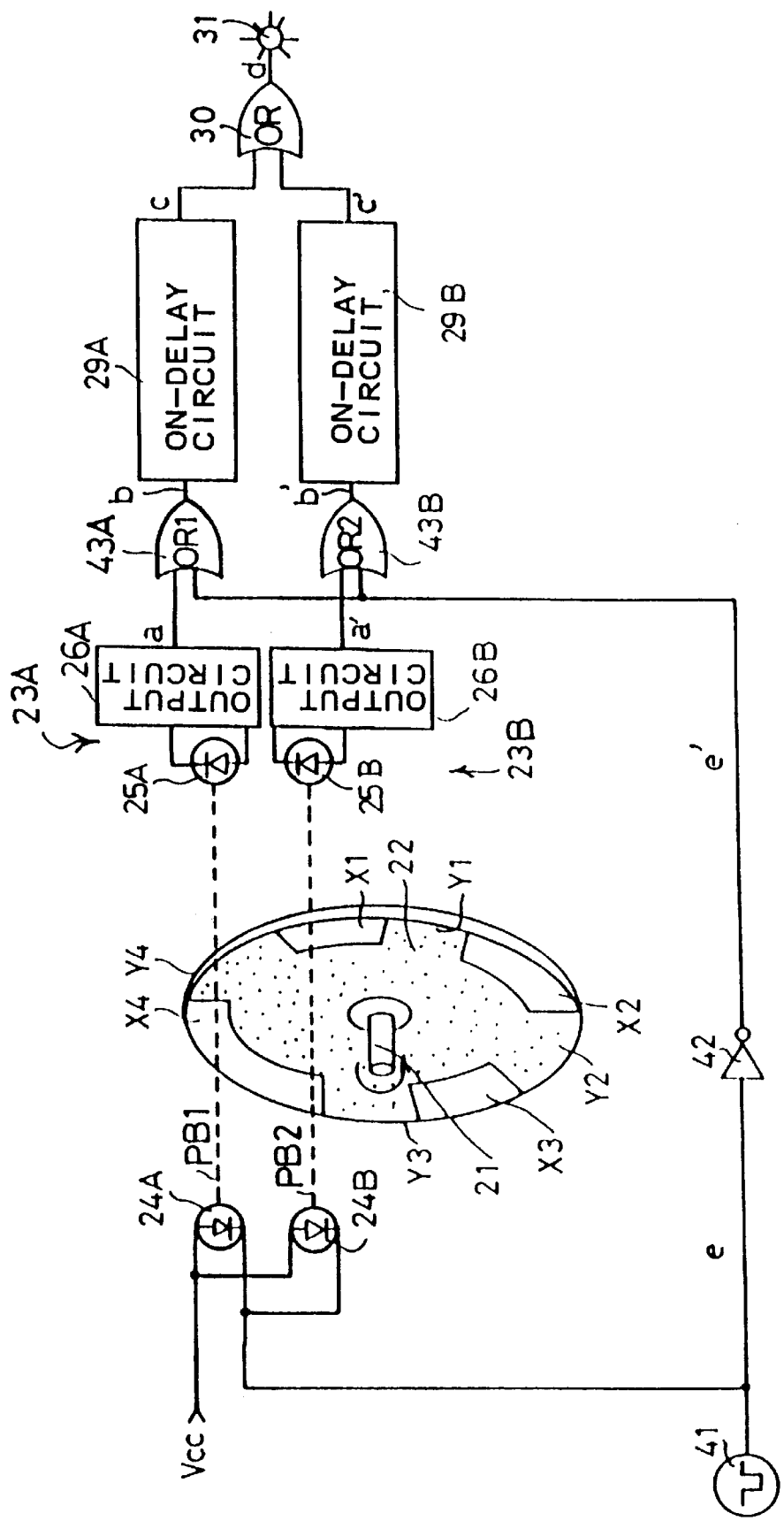
FIG. 4 is a circuit diagram illustrating a second embodiment of the present invention.

FIG. 4 illustrates a second embodiment of the present invention having a fail-safe construction using a DC signal. Components the same as those of the first embodiment illustrated in FIG. 1 are denoted by the same symbol and description is omitted.

With the embodiment of FIG. 4, a DC signal Vcc is applied to light sources 24A, 24B. Also applied to the light sources 24A, 24B from a checking signal generator 41 is a light extinguishing pulse signal serving as a checking signal, and having a pulse width of a time t sufficiently shorter than a receiving time in which the light receiving elements 25A, 25B are receiving light beams PB1, PB2 when the disk 22 is rotating. An output e from the checking signal generator 41 is input to a NOT circuit 42, and an output e' from the NOT circuit 42 is respectively input to OR circuits 43A, 43B serving as first logical sum circuits into which is respectively input outputs a, a' from optical sensors 23A, 23B. Logical outputs b, b' from the respective OR circuits 43A, 43B are input to on-delay circuits 29A, 29B having the same construction as with the first embodiment. Outputs c, c' from the on-delay circuits 29A, 29B are input to an OR circuit 30 serving as a second logical sum circuit the same as with the first embodiment, and an indicator lamp 31 is then controlled by an output d from the OR circuit 30.

Figure 5:
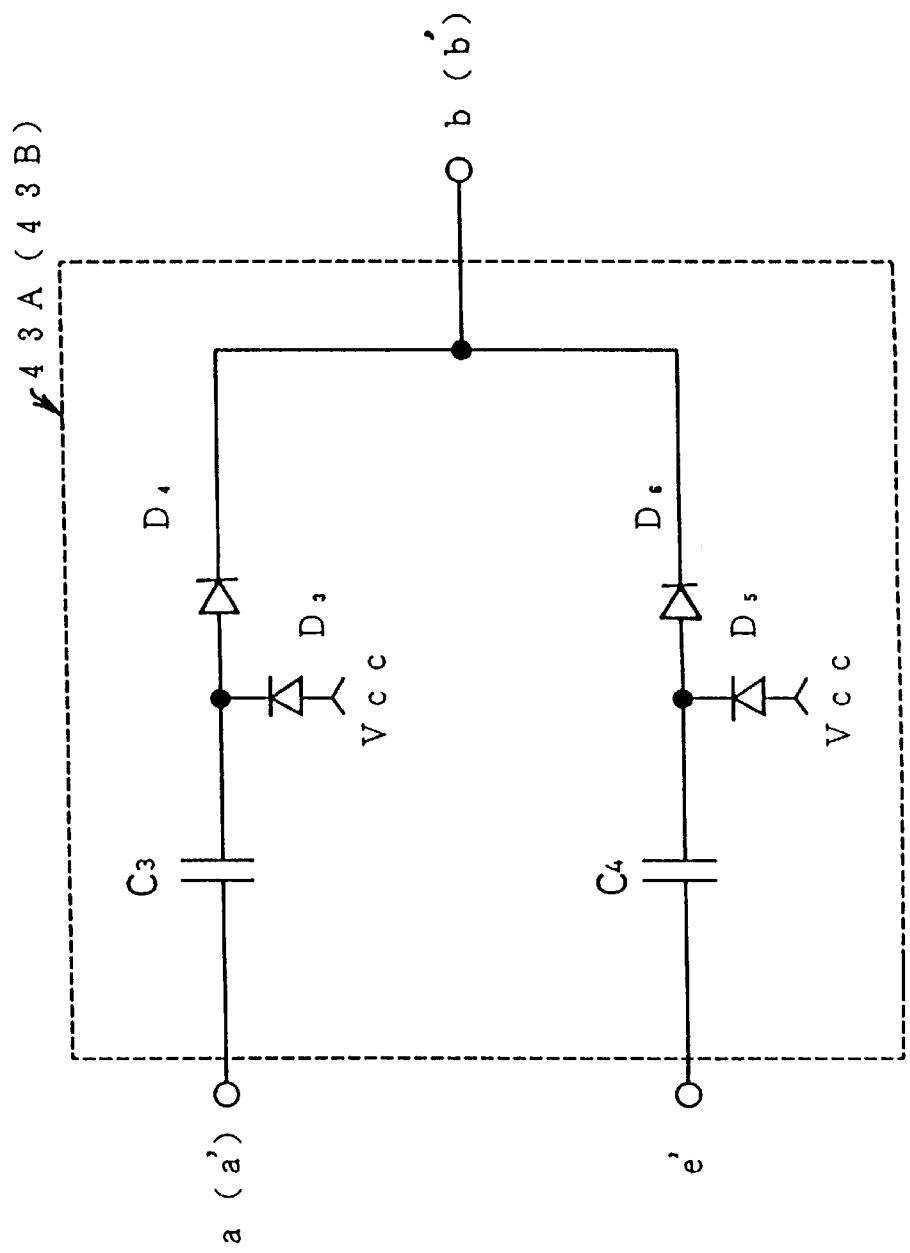
FIG. 5 is a circuit diagram of an OR circuit used in the second embodiment.

The OR circuits 43A, 43B serving as first logical sum circuits, are constructed as shown in FIG. 5. Since these both have the same construction, only that of the OR circuit 43A is given in FIG. 5.

This comprises two coupling capacitors $C_3$, $C_4$, two clamping diodes $D_3$, $D_5$ for clamping the input signals which are respectively transmitted via the coupling capacitors $C_3$, $C_4$, at a constant voltage Vcc, and two rectifying diodes $D_4$, $D_6$. The construction is such that an output a from the optical sensors 23A and an output e' from the NOT circuit 42 are input via the coupling capacitors $C_3$, $C_4$ which serve as respective AC coupling devices, and output terminals of the rectifying diodes $D_4$, $D_5$ are connected to give a wired OR circuit.

Figure 6:
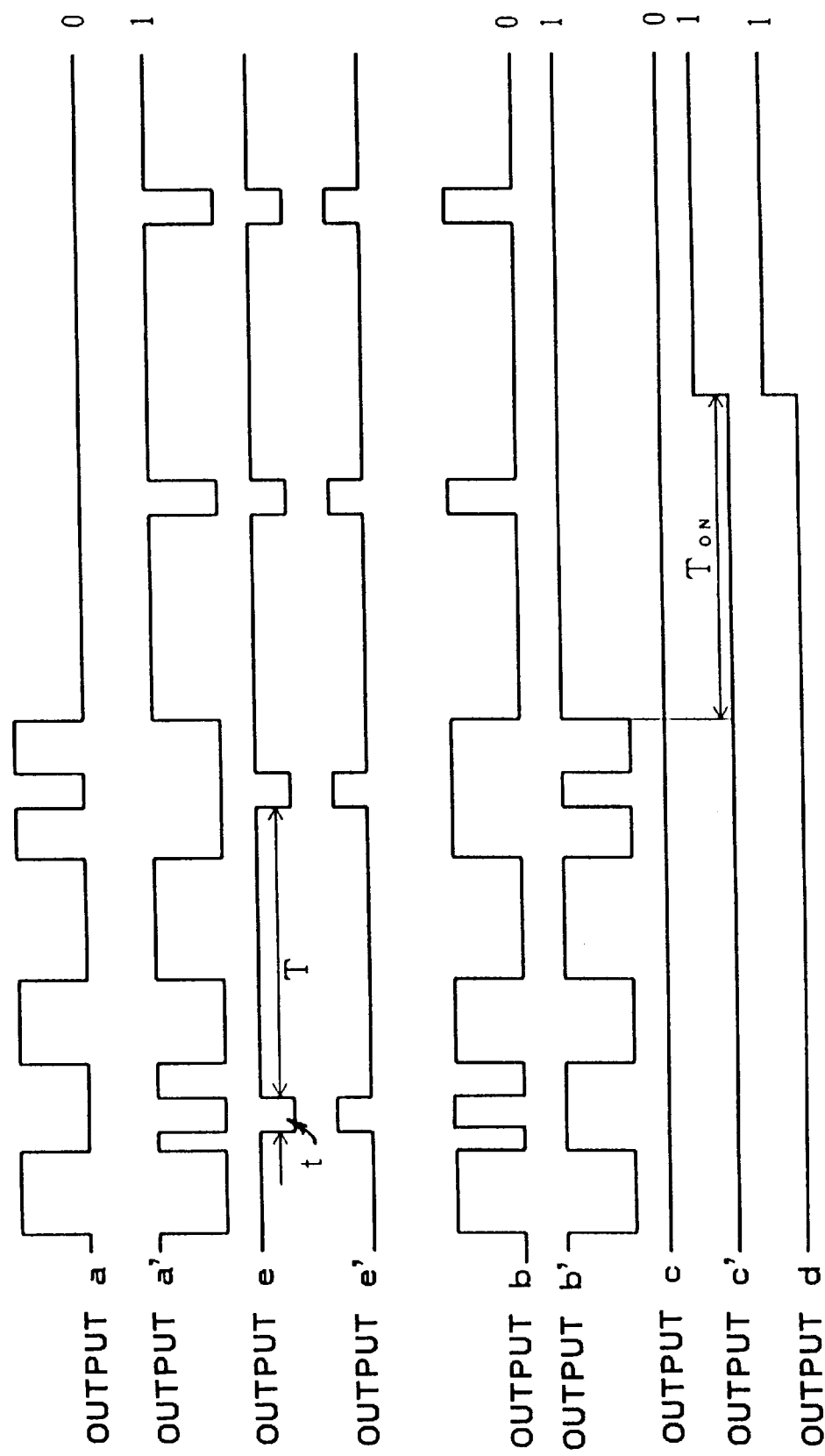
FIG. 6 is a time chart showing output conditions of respective portions of the circuit of FIG. 4.

A description of the operation will now be given with reference to the time chart of FIG. 6.

When the disk 22 is rotating, the outputs a, a' from the optical sensors 23A, 23B become alternate high levels following the rotation of the disk 22. When a pulse signal (a signal of pulse width t) is generated from the checking signal generator 41, while a transparent portion $X_1$, $X_2$, $X_3$ or $X_4$ is intersecting a light beam PB1 or PB2, then as shown by the time chart of FIG. 6, the output a, or a' of the respective optical sensors 23A, 23B becomes a low level. The OR circuits 43A, 43B then generate logical sum outputs b, b' for the outputs a, a' from the optical sensors 23A, 23B and the NOT output e' from the NOT circuit 42 which is based on the pulse signal e. While the disk 22 is rotating, the periods of the high level conditions for the logical sum outputs b, b' from the OR circuits 43A, 43B, are shorter than the delay times $T_{ON}$ of the on-delay circuits 29A, 29B. Therefore the outputs c, c' from the on-delay circuits 29A, 29B both become a low level and the indicator lamp 31 is not illuminated.

When the disk 22 stops for example in the condition shown in FIG. 4 (the light beam PB2 of the optical sensor 23B passes through the transparent portion $X_1$), then the output a' from the optical sensor 23B is maintained at a high level. However, when the light source 24B is extinguished by the pulse signal of pulse width t from the checking signal generator 41, this output a' becomes a low level, and at this time, the NOT output e' from the NOT circuit 42 becomes a high level. In this way, with this embodiment, while only a DC signal is used, the output a' from the optical sensor 23B is synchronized with the generation of the pulse signal (a signal of pulse width t) serving as the checking signal, and thus intermittently becomes a low level. Furthermore, the NOT output e' from the NOT circuit 42 also is synchronized with the generation of the pulse signal, becoming a high level. Both outputs a' and e' are then input to the OR circuit 43B. Consequently, when the disk 22 stops in the condition of FIG. 4, the logical output b' from the OR circuit 43B is maintained at a high level condition corresponding to logic value 1, and if this continues for longer than the delay time $T_{ON}$ of the on-delay circuit 29B, then the output c' from the on-delay circuit 29B becomes a high level and the indicator lamp 31 comes on thus advising that the disk 22 has stopped. When the disk 22 is stopped, the logical output b from the OR circuit 43A is also synchronized with the pulse signal (the signal of pulse width t) from the checking signal generator 41, becoming a high level. However, since this is for a sufficiently shorter time than the delay time $T_{ON}$ of the on-delay circuit 29A (t<$T_{ON}$), then the output c from the on-delay circuit 29A remains at a low level condition.

With such a construction, if for example both of the light receiving elements 25A, 25B have a short circuit fault, the outputs a, a' from the output circuits 26A, 26B do not become AC signals which become intermittent low levels synchronized with the pulse signal e, but are not AC signals. These are therefore blocked on the coupling capacitor C3 side. Consequently the outputs b, b' from the OR circuits 43A, 43B only become intermittent high levels due to the NOT output e' from the NOT circuit 42, and the outputs c, c' from the on-delay circuits 29A, 29B thus remain at a low level. Moreover, if the input line to the NOT circuit 42 becomes disconnected, then conversely the outputs b, b' from the OR circuits 43A, 43B become intermittent high levels synchronized with the outputs a, a' from the optical sensors 23A, 23B. However if the delay time $T_{ON}$ of the on-delay circuits 29A, 29B is set longer than the generation interval T ($T_{ON}$>T) of the pulse signal (the signal of pulse width t), then the outputs c, c' from the on-delay circuits 29A, 29B will remain at a low level and the indicator lamp 31 will thus become extinguished indicating that the disk 22 is rotating (danger).

In the above manner, with the construction of the second embodiment, then even in the case of the configuration where the light sources 24A, 24B are illuminated using DC signals, fail-safe characteristics the same as with the first embodiment using AC signals can be ensured. Moreover, there is the advantage that checking for the normalcy of the output conditions of the optical sensors 23A, 23B can be carried out simultaneously using the checking signal e from the checking signal generator 41.

With the above respective embodiments, the construction is such that the light beams from the light sources pass through the disk and are received by the light receiving elements. However, the light beams in the first and second embodiments can instead be reflected by the disk and the reflected beams then received by the light receiving elements.

Figure 7:
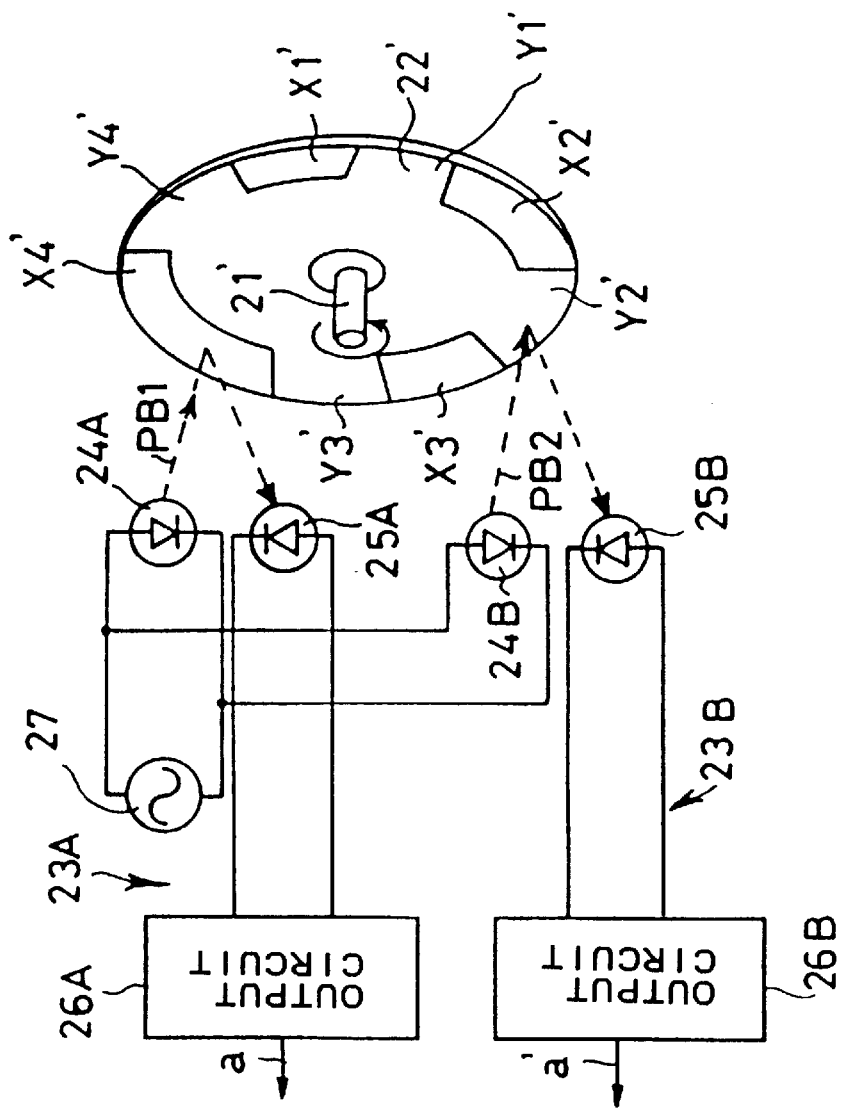
FIG. 7 is a configuration diagram of the main parts of a third embodiment of the present invention.

FIG. 7 shows a third embodiment of the present invention where the light beams are reflected. Components the same as in the beforementioned embodiments are indicated by the same symbols and description is omitted.

In FIG. 7, a disk 22' axially supported on a rotation shaft 21' has instead of the transparent portions $X_1, X_2, X_3, X_4$ and the opaque portions $Y_1, Y_2, Y3, Y4$ of the first and second embodiments, reflection portions $X_1', X_2', X_3', X_4'$ serving as optical guide portions for reflecting light beams PB1, PB2, and non reflection portions $Y_1', Y_2', Y_3', Y_4'$ serving as light shut off portions which do not reflect the light beams PB1, PB2, each having approximately equal width around the circumferential direction of an outer peripheral portion of the disk 22'.

Respective optical sensors 23A, 23B are constructed with respective light sources 24A, 24B and light receiving elements 25A, 25B located on the same side of the disk 22' so that the light receiving element 25A receives the reflected light of the light beam from the light source 24A, and the light receiving element 25B receives the reflected light of the light beam from the light source 24B. Moreover, the optical sensors 23A, 23B are located such that when the disk 22' is stopped, one or other receives reflected light from one of the reflecting portions $X_1', X_2', X_3', X_4'$. Respective outputs a, a' from respective output circuits 26A, 26B are processed using the same circuit configuration as shown in FIG. 1. Furthermore, in the case where instead of the signal generating circuit 27, a DC signal Vcc is used, then the respective outputs a, a' can be processed using the same circuit configuration as shown in FIG. 4.

Now with the respective embodiments, the construction has been for two optical sensors and two light beams, however obviously three or more optical sensors can be used. In this case, it will be clear that with the second embodiment, the number of inputs to the respective OR circuits corresponding to first logical sum circuits can be increased to correspond to the number of optical sensors.

With the present invention as described above, since when the rotatable body is stopped there is always an optical sensor with a fixed high level condition, then a high level output can be generated when the rotatable body is stopped without using a NOT circuit to carry out a NOT operation on the output signal from the optical sensor. Hence the stopped condition of the rotatable body can be directly advised using the output energy from the optical sensor.

With the present invention, in the case where a rotation stopped condition of a rotating body is advised by illumination of an indicator lamp or the like, this can be given a fail-safe construction without using NOT operation processing to carry out a NOT operation on the output signal from the optical sensor. Hence industrial applicability is significant.

I claim:

1. A rotation detection sensor for detecting a rotation stopped condition, comprising:
   a plurality of optical sensors, each having light emitting means and light receiving means, said light emitting means being incident on said light receiving means;
   a rotatable body having an optical guide portion for guiding light from said light emitting means to said light receiving means, and a light shut off portion for shutting off light from said light emitting means, said light shut off portion and said optical guide portion being disposed alternately on said rotatable body in a circumferential direction,
   wherein said optical sensors are disposed such that when said rotatable body is in a stopped condition, at least one or more of said plurality of optical sensors is at a position where light is received via said optical guide portion of said rotatable body.

2. The rotation detection sensor of claim 1, wherein:
   said optical guide portion comprises a transparent portion; and
   said light shut off portion comprises an opaque portion.

3. The rotation detection sensor of claim 2, wherein:
   said optical sensors are constructed such that said light emitting means and said light receiving means are disposed on either side of said rotatable body and facing each other.

4. The rotation detection sensor of claim 1, wherein:
   said optical guide portion comprises a light reflecting portion; and
   said light shut off portion comprises a non reflecting portion.

5. The rotation detection sensor of claim 4, wherein:
   said optical sensors are constructed such that said light emitting means and said light receiving means are disposed on the same side with respect to said rotatable body.

6. The rotation detection sensor of claim 1, further comprising:
   an AC signal generator to produce an AC signal, said light emitting means, produces an AC light beam in response to said AC signal generator, and said light receiving means receives said AC light beam and produces an AC output signal;
   a rectifying circuit for each of said plurality of optical sensors for rectifying said AC output signal from said optical sensors and producing a rectifying output signal;
   an on-delay circuit for generating a delay output signal after lapse of a predetermined time from input of said rectified output signal from said rectifying circuit; and
   a logical sum circuit for carrying out a logical sum operation on said delay output from said on-delay circuit,
   such that when an output from said logical sum circuit is a logic value 1, said rotatable body is in a stopped condition.

7. The rotation detection sensor of claim 1, further comprising:
   a DC signal generator to produce a DC signal, said light emitting means produces a DC light beam in response to said DC signal generator, and said light receiving means receives said DC light beam and produces a DC output signal;
   a checking signal generator for applying a checking signal to said light emitting means in order to intermittently stop said light beam emitting operation of said light emitting means;
   a NOT circuit for carrying out a NOT operation on said checking signal from said checking signal generator and producing a NOT signal;
   a first logical sum circuit for each of said optical sensors for receiving, via AC coupling means, said NOT signal and said DC output signal, carrying out a logical sum operation, and producing a logical output signal;
   an on-delay circuit for generating a delay output signal after lapse of a predetermined time from input of said logical output signal from said first logical sum circuit; and a second logical sum circuit for carrying out a logical sum operation on said delay output from said on-delay circuit, such that when an output from said second logical sum circuit is a logic value 1, said rotatable body is in a stopped condition.

8. A rotation detection sensor for detecting a rotation stopped condition, comprising:

a plurality of optical sensors each having light emitting means and light receiving means, said light emitting means being incident on said light receiving means;

a rotatable body having an optical guide portion for guiding light from said light emitting means to said light receiving means, and a light shut off portion for shutting off light from said light emitting means, said light shut off portion and said optical guide portion being disposed alternately on said rotatable body in a circumferential direction, wherein said optical sensors are disposed such that when said rotatable body is in a stopped condition, at least one or more of said plurality of optical sensors is at a position where light is received via said optical guide portion of said rotatable body;

an AC signal generator to produce an AC signal, said light emitting means produces an AC light beam in response to said AC signal generator, and said light receiving means receives said AC light beam and produces an AC output signal;

a rectifying circuit for each of said plurality of optical sensors for rectifying said AC output signal from said optical sensors and producing a rectified output signal;

an on-delay circuit for generating a delay output signal after lapse of a predetermined time from input of said rectified output signal from said rectifying circuit; and a logical sum circuit for carrying out a logical sum operation on said delay output from said on-delay circuit, such that when an output from said logical sum circuit is a logic value 1, said rotatable body is in a stopped condition.

9. A rotation detection sensor for detecting a rotation stopped condition, comprising:

a plurality of optical sensors each having light emitting means and light receiving means, said light emitting means being incident on said light receiving means;

a rotatable body having an optical guide portion for guiding light from said light emitting means to said light receiving means, and a light shut off portion for shutting off light from said light emitting means, said light shut off portion and said optical guide portion being disposed alternately on said rotatable body in a circumferential direction, wherein said optical sensors are disposed such that when said rotatable body is in a stopped condition, at least one or more of said plurality of optical sensors is at a position where light is received via said optical guide portion of said rotatable body;

a DC signal generator to produce a DC signal, said light emitting means produces a DC light beam in response to said DC signal generator, and said light receiving means receives said DC light beam and produces a DC output signal;

a checking signal generator for applying a checking signal to said light emitting means in order to intermittently stop said light beam emitting operation of said light emitting means;

a NOT circuit for carrying out a NOT operation on said checking signal from said checking signal generator and producing a NOT signal;

a first logical sum circuit for each of said optical sensors for receiving, via AC coupling means, said NOT signal and said DC output signal, carrying out a logical sum operation, and producing a logical output signal;

an on-delay circuit for generating a delay output signal after lapse of a predetermined time from input of said logical output signal from said first logical sum circuit; and a second logical sum circuit for carrying out a logical sum operation on said delay output from said on-delay circuit, such that when an output from said second logical sum circuit is a logic value 1, said rotatable body is in a stopped condition.

* * * * *